Inventor
ALBERT G. WAGNER,

June 4, 1929.  A. G. WAGNER  1,715,441
GEAR SHIFTING MECHANISM
Filed Dec. 18, 1926   3 Sheets-Sheet 2
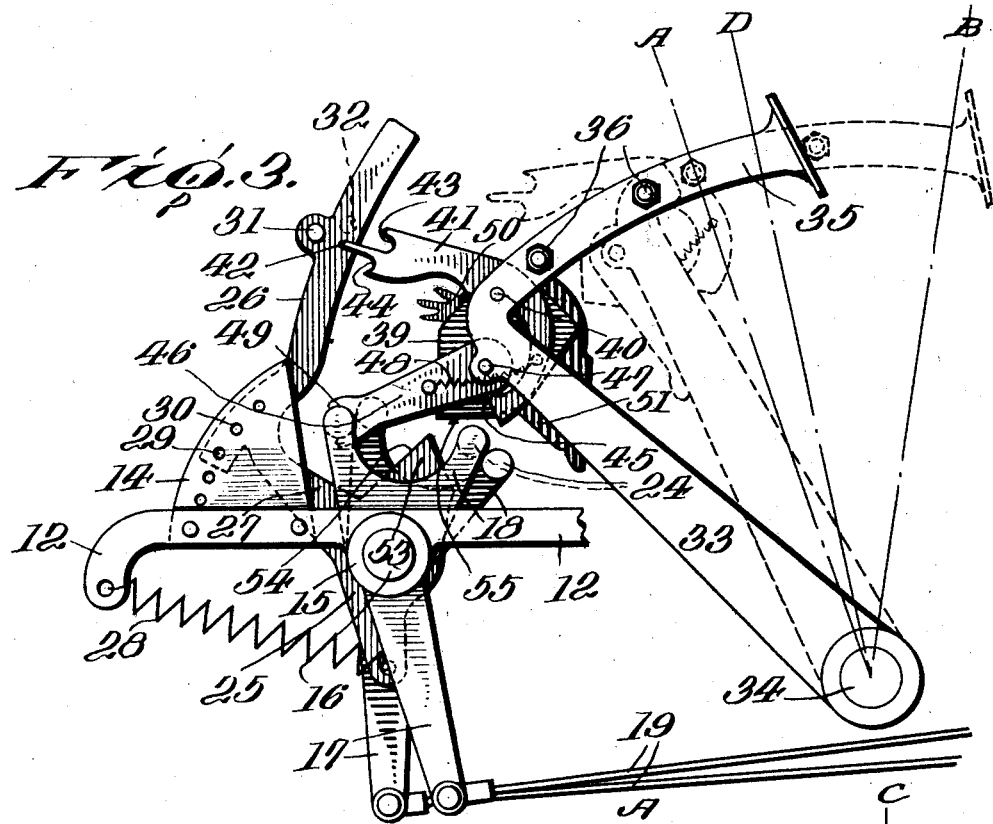
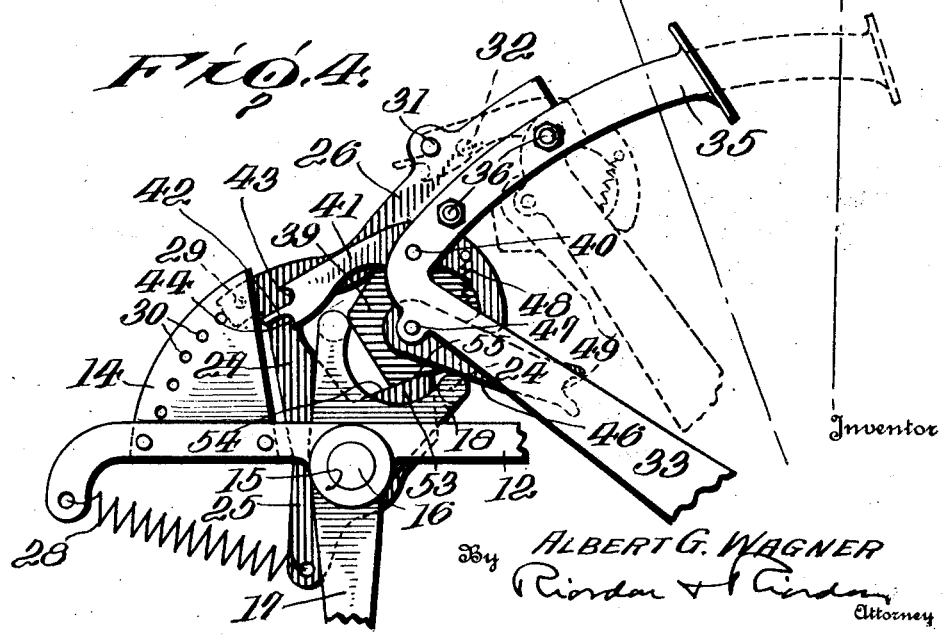
Inventor
ALBERT G. WAGNER
By Riordan & Riordan
Attorney

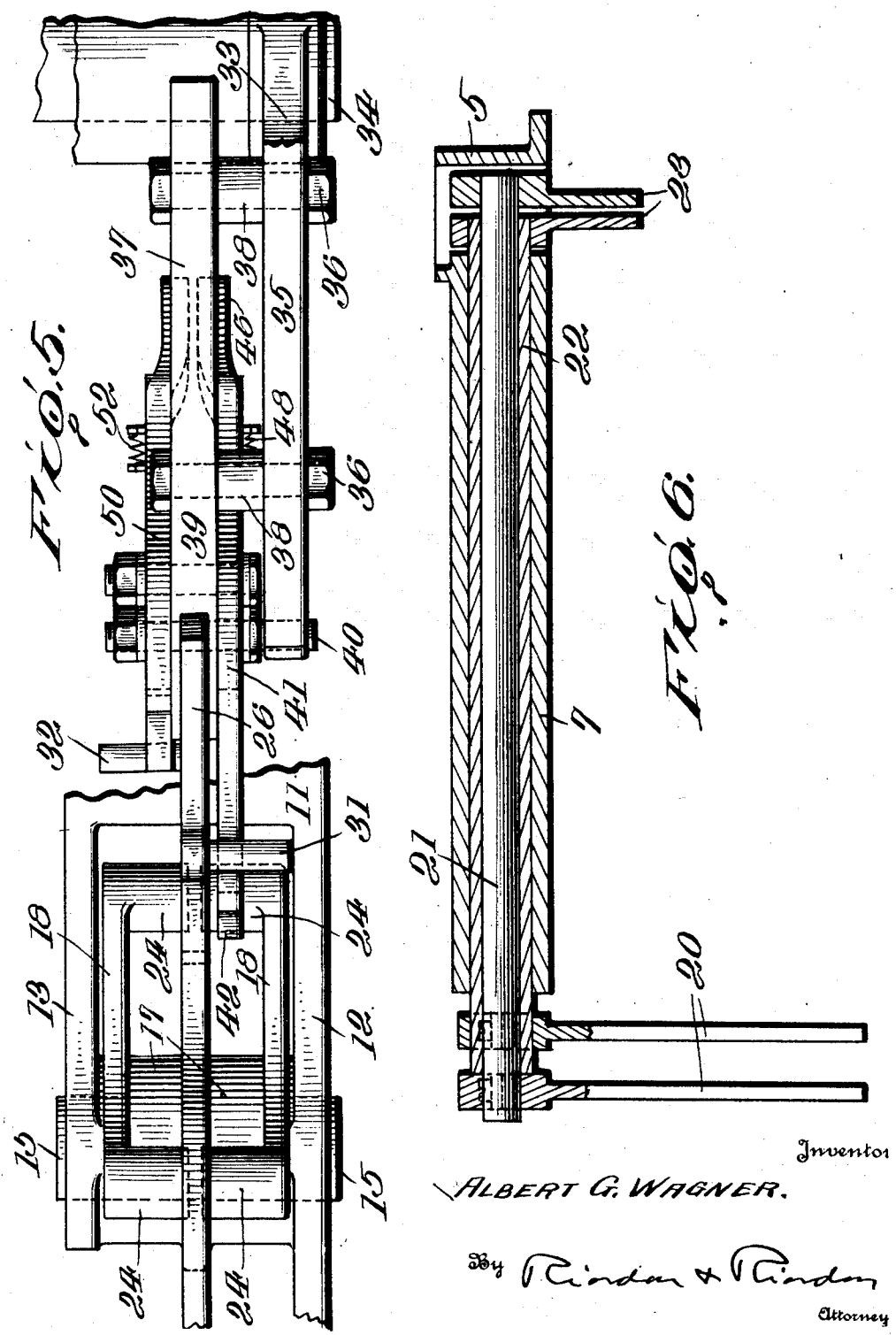

Patented June 4, 1929.

1,715,441

UNITED STATES PATENT OFFICE.

ALBERT G. WAGNER, OF CINCINNATI, OHIO, ASSIGNOR TO THE WEMB COMPANY, OF CINCINNATI, OHIO, A CORPORATION OF OHIO.

GEAR-SHIFTING MECHANISM.

Application filed December 18, 1926. Serial No. 155,685.

The primary object of this invention is to provide a novel mechanism whereby the transmission gearing of an automobile may be set for a desired speed through the ordinary clutch pedal movement, the usual hand shift lever and all manually operated presetters or selectors being dispensed with and the operator of the vehicle having his hands free for other purposes at all times.

The invention also has for an object the provision of a gear-selector mounted on the vehicle chassis in advance of the clutch pedal, and elements mounted on and movable with the clutch pedal cooperating with the selector to actuate intermediate connections and effect the required movement of the gear-shifting slide.

These and other objects which will hereinafter incidentally appear are attained in such an apparatus as is illustrated in the accompanying drawings, and the invention resides in certain novel features which will be hereinafter first fully described and then more particularly pointed out in the appended claims.

In the drawings:

Figs. 3 and 4 are elevations, on a larger scale, of the parts immediately actuated by the clutch pedal, illustrating different adjustments;

Fig. 5 is an enlarged partial plan view; and

Fig. 6 is a sectional elevation of the gear-shifting rock shafts.

Figure 1:
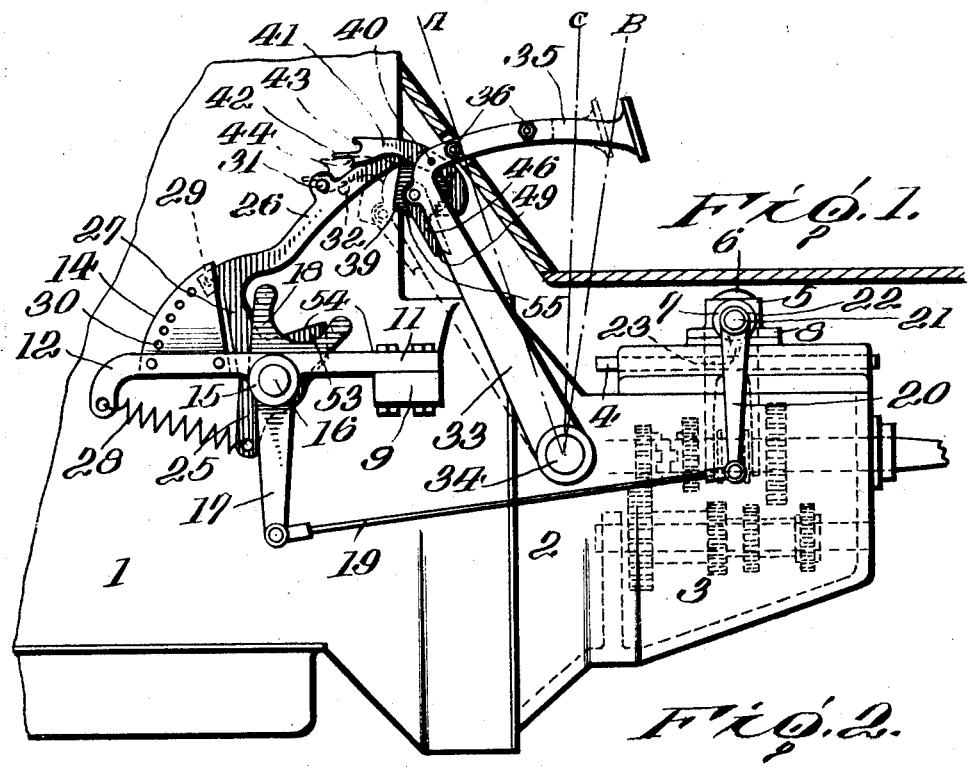
Fig. 1 is a side elevation of a portion of an automobile engine, the transmission case, and clutch pedal with the invention applied thereto, the transmission gears being shown by dotted lines.

In the drawings, the numeral 1 indicates a portion of the engine, 2 the clutch case, and 3 the transmission case, shift bars or rods 4 being slidably mounted in the case 3 and equipped with gear shifting forks or yokes in the usual manner. Ordinarily, in present practice, the slides or shift bars are operated by a hand lever mounted in a box 5 on the transmission case, but by my invention the hand lever is dispensed with and the top of the box is closed by a cover 6 while a bearing sleeve 7 is formed on the side of the box and projects laterally therefrom, said sleeve being reenforced by bracing flanges 8 which are bolted on the top of the transmission case. Rigidly secured on one of the engine supporting arms 9, which is bolted to the chassis side bar 10, is a forwardly projecting bracket 11, which presents two parallel bars 12 and 13 in advance of the bar 9, the bar 12 being longer than the bar 13 and having an upstanding holding plate 14 rigidly secured upon its front end portion. Bearing lugs 15 are provided on the bars 12 and 13 and carry a fulcrum pin 16 on which rockers 17 are loosely mounted. The upper end of each rocker is formed into a forked head 18, for a purpose which will presently appear, and to the lower end of each rocker is pivoted the front end of a pitman or connecting rod 19 which has its rear end pivoted to the lower end of a crank 20. The outer crank 20, by which term is meant the crank nearer the chassis side bar, is secured to the outer end of a shaft 21 extending axially through the sleeve 7, while the inner crank 20 is secured to the outer end of a hollow shaft 22, which fits around the shaft 21 and within the sleeve 7, as shown clearly in Fig. 6. On the inner ends of the shafts 21, 22, are shifting cranks or fingers 23 engaged with the respective slides 4. The forked heads 18 are each provided with lateral studs or lugs 24, at the extremities of the forks, the lugs on the inner fork projecting outwardly and the lugs on the outer fork projecting inwardly, as shown in Figs. 2 and 5. Mounted loosely on the fulcrum rod or pin 16 between the forked heads 18 is the selector which consists of a body plate 25 and an arm 26 extending upwardly and forwardly and connected with the upper forward portion of the body plate by a shoulder member 27, it being noted at this point that the forward lugs or studs 24 project into the path of the shoulder member and nearly meet. The body plate 25 extends below as well as above the pin 16 and to its lower end is secured one end of a contractile spring 28 which has its opposite end secured to the front extremity of the bracket arm 12, the action of the spring being to hold the selector in the position shown in Figs. 1 and 4 and throw the gears in the neutral position. At the junction of the arm 26 and shoulder 27 there is a lateral pin or stud 29 which bears against the side of the lock or keeper plate 14 and is adapted to ride into any one of the sockets 30 in said plate and hold the selector in a position to which it may be moved against the action of the spring 28. On the opposite sides of the arm 26, near its rear free end, are selector studs 31, 32, the stud 31, on the outer side, being located somewhat higher and forward of the stud 32, which is on the inner side of the arm.

Figure 2:
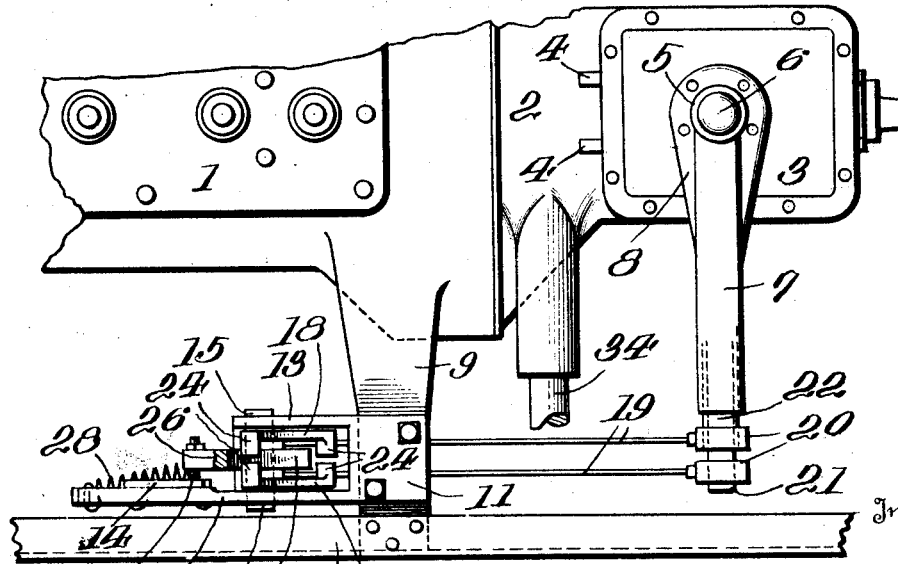
Fig. 2 is a plan view with the clutch pedal removed and the selector bar in horizontal section.

The clutch pedal is of the usual form including a crank or lever 33 secured to the clutch setting shaft 34, and a foot piece or treadle 35 extending rearwardly from the upper end of the crank or lever through the floor of the vehicle, as shown in Fig. 1, to be operated by the foot of the chauffer in the usual manner. Secured to the inner side of the pedal by bolts 36 is a setter arm 37 maintained in parallel relation to the pedal by spacers 38 around the bolts, the arm being disposed in the vertical plane of the selector bar 26. This setter arm, through its major portion is substantially of the same form as the foot piece of the pedal, and at its forward end is expanded vertically to form a cam plate 39 which at times will impinge upon the body plate 25 and actuate the selector. Pivoted at 40 and disposed between the pedal and the setter arm is a bell crank or angle lever 41 the upper arm of which projects forwardly and terminates in a tongue 42 between end notches 43, 44. The shorter arm of this bell crank or angle lever extends downwardly in hook form to define a toe 45 bearing against a dog or pusher 46 which is pivoted upon the pedal crank 33, as at 47, and is yieldably held to the bell crank by a spring 48 in an obvious manner. The free end of the pusher is notched or shaped to form a seat 49 to engage either of the outer pins or studs 24 and thereby rock the outer head 18 and set the gears in a selected combination. On the inner side of the setter arm cam plate 39 there are mounted a bell crank 50 and a pusher 51 held yieldably to the bell crank by a spring 52, these parts corresponding in all respects to the parts 41, 46 and 48, except that the upper forward arm of the bell crank 50 is shorter than the upper arm of the bell crank 41 and the pusher 51 cooperates with the inner studs 24 to rock the inner head 18 and set the gears in different relations.

It is to be noted that the body plate of the selector is formed with a rearwardly projecting extension 53 above its pivot presenting a surface 54 adapted to be engaged by a surface 55 on the cam 39. It is also to be observed that the curvature of the selector bar 26 is the same as the curvature of the setter arm 37 so that when the gears are in neutral position the selector bar will rest on the setter arm, as shown in Fig. 4.

The operation of the device is as follows;

The ordinary or normal clutch pedal movement is between the lines A B radiating from the clutch shaft 34, the clutch being in when the pedal is at the line B and out when the pedal is at the line A. With my invention, movement of the pedal to the forward limit A will set the gears in neutral by the cam plate 39 contacting with any or all of the lugs 24 on the upper ends of the levers 17 as shown in Figs. 3 and 4, and, as the gears should always be put in neutral prior to a shift, the pedal should always be pushed forward to the full extent of its movement before attempting to shift gears for a change of speed. The selector arm will be deneutralized moving from the position shown in Fig. 3 to the position shown in Fig. 4 as the lugs 24 are moved by the cam 39. The gears having been set, however, the pedal may be moved to any degree short of its forward limit, as to the line C in Fig. 1 or D in Fig. 3, without disturbing the gears.

In parking the car for the night, pushing the pedal to line A and removing the foot entirely places the gears in neutral as shown in Fig. 1. Now pushing the pedal to line C or any distance short of line D places the selector in neutral. The parts will then be as in Fig. 1 with the exception of the selector arm which will be in the position as shown in Fig. 3. Upon starting the car, the pedal should be pushed all the way down to line A which will deneutralize the selector arm, the gears remaining in neutral. Upon return movement of the pedal, clicks will be felt, as the cranks 41 and 50 ride past the studs 31 and 32 the pedal being returned until the third click is felt to select first gear, as hereinafter set forth.

Thus it will be seen that all parts are placed in neutral, both the gears and the selector arm, when the car is brought to rest for any period of time. Fig. 1 shows the gears in neutral but not the selector arm. Fig. 3 shows the selector arm in neutral but not the gears.

Assuming that the gears are to be set in reverse position, the pedal is pushed forward to the limit, thereby setting the gears in neutral and then permitted to come all the way back, the parts then assuming the positions shown in Fig. 1. The pedal is then again pushed forward whereupon the lower notch 44 in the end of the bell crank 41 will engage the stud 31 on the selector bar and tend to rock the bar forwardly about the fulcrum 16. When the selector bar is thus rocked, it, in turn, causes a rocking movement of the bell crank and the parts assume the position shown in Fig. 3, the point 42 sliding off of stud 31, the selector arm having been pushed during this rocking action into engagement with the plate 14. It will be noted that as the pedal continues its downward stroke to complete the movement, point 42 can slide off of stud 31 as the selector arm 36 is free to move outwardly any amount required to clear the point 42 and the stud. The selector bar has been moved so that the stud 29 engages one of the sockets 30 and thereby locks the bar in its inoperative position shown in Fig. 3, and the bar will remain in this inoperative position until the pedal is actuated to return the gears to the neutral position. Now, when the bell crank 41 was rocked upward relative to the treadle, as indicated in Fig. 3, the toe 45 was swung forwardly and pushed the dog or pusher 46 forwardly so that, as the movement of the pedal continues, the free end of the dog engaged the forward lug 24 on the outer head 18 and rocked the head forwardly, the lower crank 17 being, of course, swung rearwardly and a corresponding movement imparted to the gear shift shaft 21. When the pedal then moves rearwardly, the dog and bell crank will be freed and will resume their normal positions close to the lines of the pedal, as shown by dotted lines in Fig. 3. Movement of the pedal will then have no effect to cause engagement of the dog or bell crank with other parts and, of course, will not cause any additional shifting of the gears. When the dog or pusher 46 was swung forward as above described, it assumed a position approaching the horizontal and cleared the rear lug 24. If, however, the upper notch 43 in the bell crank had engaged the stud 31, the hook end 45 would not have swung so far forward and the dog would have hung in a nearly vertical position, so that the forward and downward movement of the pedal would have caused the dog to engage the rear stud 24 and press downwardly thereon. As a result, the head 18 would have been rocked rearwardly and the extension 17 swung forward to set the gears for low speed ahead.

If it be desired to change speed, the pedal is pushed forward a full stroke, the dogs and bell cranks being inactive since the selector is in the position shown in Fig. 3. As the pedal reaches the position of the line A, the cam member 39 is caused to bear upon the extension 53 and swing the same downwardly, the selector being released from the keeper plate and swung into the position shown in Fig. 4 through the combined action of the cam member 39 and the spring 28. In this position, the selector arm rests upon the setter bar and is held to the same by the spring 28 as the pedal and setter bar withdraw. When the selector swung rearwardly as described, the rear edge of the shoulder member 27 impinged against both forward studs 24 and rocked the heads 18 to the neutral position shown in Figs. 1 and 4, and it will be noted that if a head should be in a rearward position beyond the range of the selector, the forward edge of the cam member will engage the forward stud on the head and set the head in neutral. It will also be noted that when the heads are in neutral position, the forward studs will be disposed in a higher plane than the rear studs so that if the dog and bell crank be set for engagement with a forward stud there will be ample clearance over the rear stud. Having set the gears in neutral, the pedal is moved slowly rearward with the setter bar riding under the selector arm, the inner bell crank 50 being brought against the inner stud 32 and a slight impact or click being felt in the chauffeur's foot as the tongue on the end of the bell crank swings up against the stud. This action presents the upper notch in the end of the bell crank to the stud so that, if the pedal be then pushed forward to about the position of the line D, the inner head 18 will be rocked and the gears shifted to high speed. If, instead of pushing the pedal forward, the slow rearward movement be continued, a second click will be felt due to the stud 32 on selector arm 26 snapping down against the lower wall of its lower notch on the bell crank 50, whereupon a forward movement of the pedal will effect shifting of the gears to set them in second speed. Further rearward movement of the pedal will produce third and fourth clicks due to the bell crank 41 impinging against the stud 31 and setting the parts to shift into low and reverse, as before described.

It is of course obvious that when the desired click is felt, rearward movement of the clutch pedal is at once stopped and the pedal pushed forwardly to effect the shift.

Having shifted, a rearward movement merely places the clutch into engagement to permit running of the car.

It is also noteworthy that the selecting mechanism is disengaged from the clutch operating member after a shift is made and also after the gears are placed in neutral. That is to say, the shifter is always set to neutralize the gears when in mesh, as the selector is out of engagement when the gears are in mesh and when the gears are in neutral.

All selecting and shifting is accomplished by the usual movements of the clutch pedal, the selecting being accomplished by a movement in one direction, the shifting by a movement in another direction and the clutching by a repetition of the movement which effected the selection of gears.

Having thus described my invention, what

I claim as new and desire to secure by Letters Patent of the United States, is:—

1. The combination of a gear-shifting mechanism, a clutch pedal, setters carried by the pedal to engage and actuate the gear-shifting mechanism, and a selector separate from said pedal and cooperating with the setters to effect a predetermined movement of the gear-shifting mechanism.

2. The combination of a gear-shifting mechanism, a clutch pedal, means operable upon movement of the pedal in one direction to select a gear ratio, and means operable upon movement of the pedal in the opposite direction to actuate the gear-shifting mechanism and set the gears in the selected ratio, said latter means being inoperative during a repetition of the first movement of the pedal.

3. The combination of a gear shifting mechanism, a clutch pedal mounted for arcuate movement through a single plane, means actuated by the pedal during a portion of said movement for setting the gear shifting mechanism in neutral, and means separate from said pedal and controlled thereby during a portion of said movement for selectively moving the gear shifting mechanism from neutral to set the gears in working ratio.

4. The combination with a gear shifting mechanism, a clutch pedal mounted for arcuate movement through a single plane, and means including a member separate from the pedal and actuated thereby during movement thereof to selectively set the gear shifting mechanism, for subsequent shifting of the gears.

5. The combination with a gear shifting mechanism, a clutch pedal mounted for swinging movement through a single plane, means actuated by the pedal during said movement thereof, to selectively set the gear shifting mechanism, for subsequent shifting of the gears, and means for setting the gear shifting mechanism in neutral upon extreme movement of the pedal in one direction.

6. The combination of a gear-shifting mechanism, a clutch pedal, setters carried by the pedal, a selector arranged to cooperate with the setters upon one movement of the pedal to select a gear combination and means acting upon a reverse movement of the pedal to actuate the gear-shifting mechanism to set the gears in the selected combination.

7. The combination of a gear-shifting mechanism, a clutch pedal, setters carried by the pedal, a selector arranged to cooperate with the setters upon one movement of the pedal to select a gear combination and means acting upon a reverse movement of the pedal to actuate the gear-shifting mechanism to set the gears in the selected combination, and means whereby the selector will be moved to and lock in an inoperative position during the setting movement of the pedal.

8. The combination of a gear-shifting mechanism, a clutch pedal, setters carried by the pedal, a selector arranged to cooperate with the setters upon one movement of the pedal to select a gear combination and means acting upon a reverse movement of the pedal to actuate the gear-shifting mechanism to set the gears in the selected combination, means whereby the selector will be moved to and locked in an inoperative position during the setting movement of the pedal, and means for releasing the selector and returning it to operative position.

9. The combination of a gear-shifting mechanism including a rocking head, a clutch pedal, a setter bar carried by the pedal, a selector arranged adjacent the pedal in the vertical plane of the setter bar, said selector and said setter being constructed to at times engage the rocking head for setting the gear-shifting means in neutral position, and means cooperating with the selector and the setter bar for selectively moving the gear-shifting mechanism from neutral to a working position.

10. The combination of a gear-shifting mechanism including a rocking head, a projection on the side of the head, a clutch pedal, a setter bar carried by the pedal and having a cam member adapted at times to engage the projection on the rocking head, a selector mounted at the opposite side of the head from the setter bar and in the vertical plane of the bar, the selector having an extension arranged to be engaged by the cam member of the setter bar whereby the selector will be moved to operative position and the gear-shifting mechanism set in neutral, and means cooperating with the setter bar and the selector for selectively actuating the rocking head and moving the gear-shifting mechanism from neutral position, the selector being simultaneously moved to inoperative position.

11. The combination of a gear-shifting mechanism, a clutch pedal, a setting device carried by the pedal and arranged to engage and actuate the gear-shifting mechanism, a selector adapted to adjust the setting device for engagement with the gear-shifting mechanism, a keeper plate, adapted to engage and retain the selector in inoperative position upon movement of the setting device into engagement with the gear-shifting mechanism, and means for releasing the selector and returning it to operative position.

12. The combination of gear-shifting mechanism, a clutch-pedal, setting mechanism carried by the pedal for actuating the gear-shifting mechanism, a selector cooperating with the setting mechanism to predetermine the movement of the gear-shifting mechanism, and means for moving the selector into operative relation to the setting mechanism.

13. The combination of a gear shifting mechanism, a clutch pedal, setting mechanism carried thereby, and a selector cooperating with said setting mechanism to predetermine movements of the gear shifting mechanism, means to move the selector into operative relation to the setting mechanism, said setting mechanism being adapted to move the selector out of said operative relation upon further movement of the pedal.

14. The combination of gear shifting mechanism, a clutch pedal, setting mechanism carried thereby, and a selector cooperating with said setting mechanism to predetermine movements of the gear shifting mechanism, means to move the selector into operative relation to the setting mechanism, said setting mechanism being adapted to move the selector out of said operative relation upon further movement of the pedal, and means to hold said selector out of operative relation to the setting mechanism.

15. The combination of gear shifting mechanism, a clutch pedal, means controlled by said pedal for actuating the gear shifting mechanism, a selector cooperating with said means to predetermine the movement of the gear shifting mechanism, and means for moving the selector into and out of operative relation to the setting mechanism.

16. The combination of a gear-shifting mechanism including a rocking head having a plurality of projections on one side, a clutch pedal, a dog carried by the pedal, and actuating means on the pedal for said dog, and a selector coacting with said actuating means to move same and thereby to place said dog in engagement with one of the projections on the rocking head to effect a predetermined movement of the gear-shifting mechanism.

17. The combination of gear-shifting mechanism, a clutch pedal, a dog carried by the pedal to actuate the gear-shifting mechanism, and means for imparting a variable throw to the dog whereby to determine the movement of the gear-shifting mechanism.

18. The combination of gear-shifting mechanism, a clutch pedal, a dog carried by the pedal to actuate the gear-shifting mechanism, a bell-crank mounted on the pedal and engaging the dog, and means for rocking the bell-crank to arrange the dog for selective engagement with the gear-shifting mechanism.

19. The combination of gear-shifting mechanism, a clutch pedal, a dog carried by the pedal, a bell-crank mounted on the pedal and having one end in engagement with the dog, means yieldably maintaining the engagement between the bell-crank and the dog, and means variably engaging the free end of the bell-crank for selectively effecting engagement between the dog and the gear-shifting mechanism.

20. The combination of a gear-shifting mechanism, a clutch pedal, a setting device carried by the pedal and engageable with the gear-shifting mechanism, and a selector bar adjacent the pedal and having means engageable with the setting device for effecting predetermined engagement of the setting device with the gear-shifting mechanism.

21. The combination of a gear-shifting mechanism, a clutch pedal, a setting means carried by the pedal and engageable with the gear-shifting mechanism to actuate the same and including an element having a plurality of notches in its end, and a selector bar having a stud engageable with either of said notches whereby to control the movement of the gear-shifting mechanism.

22. The combination of a gear-shifting mechanism, a clutch pedal, a selector bar arranged adjacent the pedal, studs on the opposite sides of the selector bar, one of said studs being in advance of another, and setting mechanism carried by the pedal and including elements disposed at opposite sides of the selector bar riding under and selectively engageable with the studs on said bar whereby to control the movement of the gear-shifting mechanism.

23. The combination of a gear shifting mechanism, means to select a gear combination and to set the gears in the selected combination, a clutch pedal positioned to operate said means for gear selection as the clutch is closed and to operate said means for gear setting as the clutch is opened.

24. In an automobile having a gear shifting mechanism and a control pedal, means, comprising a gear selector and setter, to connect said mechanism and said pedal and movable by said pedal thereby to select a desired gear ratio upon movement of the pedal in one direction and to shift said gears upon movement of the pedal in another direction.

25. The combination of a gear shifting mechanism, a clutch pedal mounted for arcuate movement through a single plane, and means actuated by the pedal during a portion of said movement thereof to selectively set the gear shifting mechanism, for later shifting operation.

26. The combination of a gear shifting mechanism, including a rocking head having a plurality of projections on one side, a clutch pedal mounted for arcuate movement through a single plane, a dog carried by the pedal, and means for causing the dog to engage one of the projections on the rocking head during said movement of the pedal thereby to effect a predetermined movement of the gear shifting mechanism.

27. The combination of a gear shifting member, a gear selector bar, an operating member and gear setters mounted on said operating member for movement therewith into engagement with said bar and said gear shifting member, said setters also being mounted for movement independent of movement of said member, said bar cooperating with the setters upon engagement therewith to effect a predetermined movement of said gear shifting member.

In testimony whereof I hereunto affix my signature.

ALBERT G. WAGNER.